United States Patent [19]
Moe et al.

[11] Patent Number: 4,819,981
[45] Date of Patent: Apr. 11, 1989

[54] SIDE OPENING, REMOVABLE PICKUP TRUCK CAP

[76] Inventors: Gilmore L. Moe, Rt. 2, Box 209, Alexandria, Minn. 56308; Gleo Swenson, P.O. Box 22, Glenwood, Minn. 56334

[21] Appl. No.: 138,955
[22] Filed: Dec. 29, 1987
[51] Int. Cl.⁴ .............................................. B60P 7/02
[52] U.S. Cl. ................................... 296/100; 296/164; 296/219
[58] Field of Search .................... 296/100, 164, 56, 76

[56] References Cited
U.S. PATENT DOCUMENTS

| | | | |
|---|---|---|---|
| 2,226,824 | 12/1940 | Larson | 296/56 X |
| 2,551,239 | 5/1951 | Bond | 296/137 |
| 2,886,375 | 5/1959 | Crawford | 296/100 |
| 3,155,423 | 11/1964 | Cripe | 296/100 |
| 3,180,674 | 4/1965 | Pounds | 296/100 |
| 3,508,787 | 4/1970 | Sfrong et al. | 296/100 |
| 3,765,716 | 10/1973 | Van Gompel | 296/100 |
| 4,051,746 | 10/1977 | Liljeros | 74/520 |
| 4,101,162 | 7/1978 | Koehn | 296/137 B |
| 4,124,247 | 11/1978 | Penner | 296/100 |
| 4,181,351 | 1/1980 | Spanke | 296/100 |
| 4,261,611 | 4/1981 | Barry | 296/100 |
| 4,429,491 | 2/1984 | Bruns | 49/340 |
| 4,489,975 | 12/1984 | Fredin | 296/181 |
| 4,629,243 | 12/1986 | Jensen | 296/100 |

Primary Examiner—Robert B. Reeves
Assistant Examiner—Brian Sells
Attorney, Agent, or Firm—Fleit, Jacobson, Cohn & Price

[57] ABSTRACT

A cap is provided for disposition over the load bed of a pickup truck and includes opposite side wall structures having lower marginal portions for close juxtaposed position relative to upper marginal portions of the side walls of the load bed. Each side wall structure and the corresponding side wall include longitudinally spaced vertically separable mounting portions supporting the side wall structure from the side wall for angular displacement relative thereto about an axis extending along the lower marginal portion of that side wall structure. In addition, each pair of mounting portions includes support and guide means interconnecting therebetween operative to guide the corresponding side wall structure relative to the corresponding side wall for up and down movement relative thereto between a lowered position juxtaposed position the side wall and an upper limit position, the support and guide structure including spring means yieldingly biasing the side wall structure toward its upper limit position. Also, each pair of mounting portions includes latch structure for releasably latching each side wall structure mounting portion against upward displacement relative to the corresponding side wall mounting portion.

6 Claims, 2 Drawing Sheets

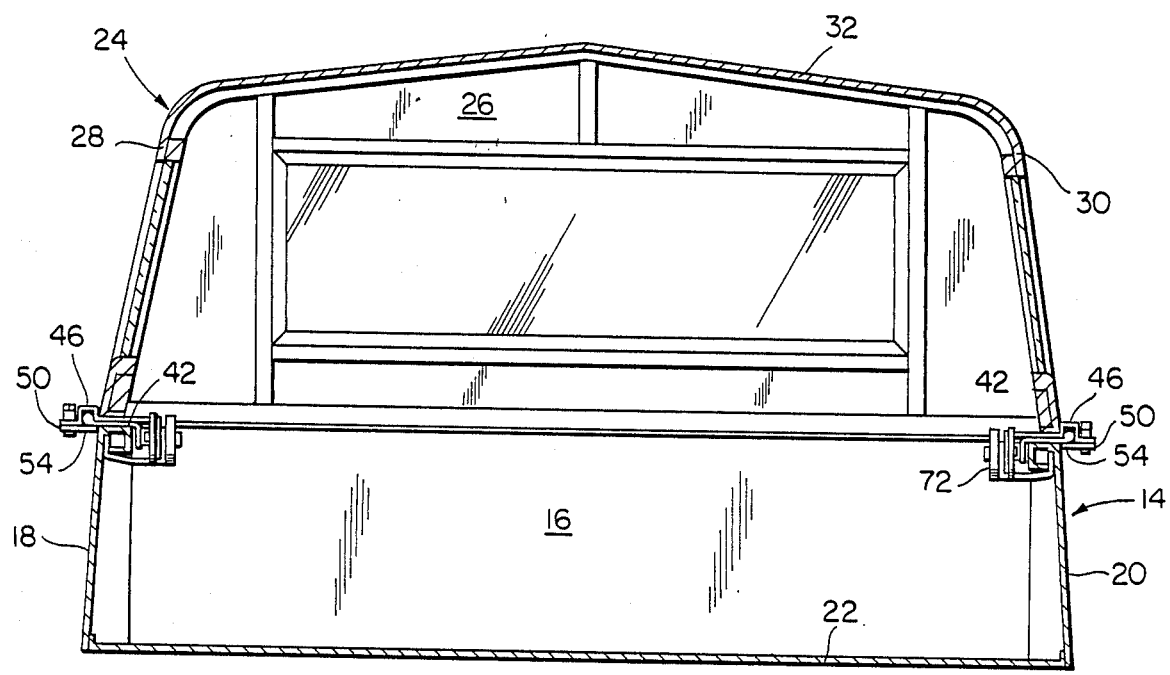
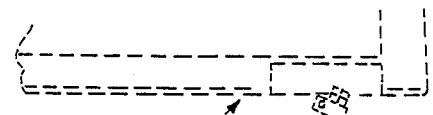
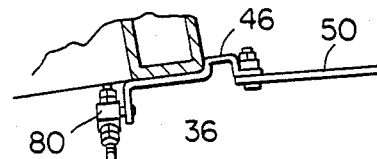
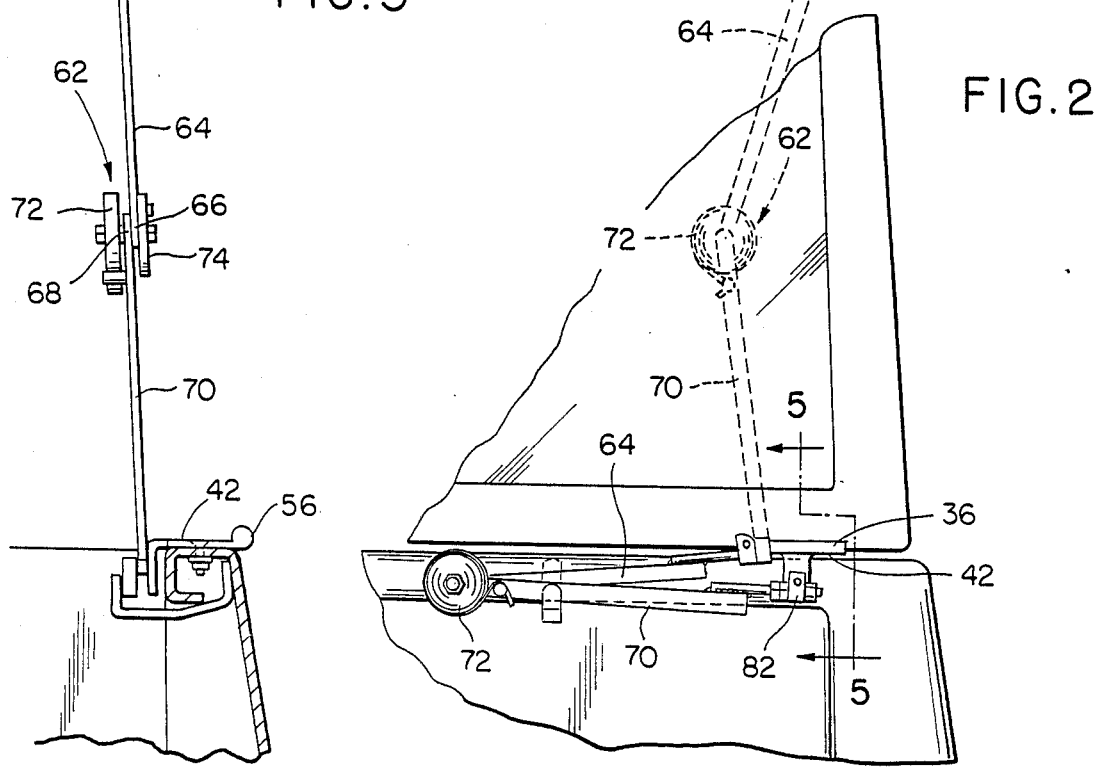

SIDE OPENING, REMOVABLE PICKUP TRUCK CAP

BACKGROUND OF THE INVENTION

1. Field of the Invention

This invention relates to a pickup truck load bed cap and structure for mounting the cap from the load bed in a manner such that the cap is readily removable from the bed and may be hinged upwardly toward an open position from either side of the load bed.

2. Description of Related Art

Various different forms of pickup truck and other load bed side opening compartments heretofore have been provided such as those disclosed in U.S. Pat. Nos. 2,551,239, 2,886,375, 3,180,674, 4,051,746, 4,101,162, 4,261,611, 4,429,491 and 4,489,975. However, these previously known devices do not include the overall structural and operational features of the instant invention which particularly well adapt a downwardly opening cap for ready removable support from a pickup truck load bed and selective opening from either side of the load bed.

SUMMARY OF THE INVENTION

The cap of the instant invention is mounted, at the front and rear end portions of the lower margin on each side wall thereof, to front and rear portions of the upper margin of the corresponding pickup truck bed side wall. The cap may be swung open from either side of the associated load bed and articulated and spring biased link structure is connected between the front and rear portions of the opposing lower and upper marginal portions of the cap and pickup truck side walls whereby an opened side of the cap may be supported and retained in the open position. In addition, both sides of the cap may be released from direct engagement with the corresponding load bed side walls and upwardly elevated to a raised upwardly supported position by the aforementioned link structure in order that a relatively high load may be positioned within the load bed through the open rear thereof and the cap subsequently may be downwardly secured over the relatively high load in a fully closed position thereover. In the immediately above mentioned elevated position, however, the cap is not securely supported from the load bed and therefore may need to be steadied relative thereto while a relatively high load is received in the load bed through the open rear thereof preparatory to downward securement of the cap thereover.

The cap is further constructed in a manner whereby it may be readily totally removed from engagement with the associated pickup truck load bed and further in a manner whereby adjustments to the aforementioned link structure may be carried out to compensate for slight incorrect longitudinal positioning of the associated cap and load bed side wall mounts by which the aforementioned link structures are operatively connected between the load bed side walls and the cap side walls.

The main object of this invention is to provide a cap for a pickup truck load bed and which may be opened from either side of the associated load bed.

Another object of this invention is to provide a pickup truck load bed and cap therefore including articulated and spring bias link structure operatively connected between the front and rear ends of the opposing lower and upper marginal edge portions of the side walls of the cap and pickup truck load bed by which the cap may have either side thereof supported and retained in an open position.

Another important object of this invention is to provide a pickup truck load bed and cap combination in accordance with the preceding objects and wherein the aforementioned link structure also may be used to support both sides of the cap in an elevated open position.

A final object of this invention to be specifically enumerated herein is to provide a pickup truck bed and cap combination in accordance with the preceding objects and which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

FIG. 1 is a transverse vertical sectional view taken substantially upon a plane passing longitudinally centrally through a pickup truck load bed and cap combination constructed in accordance with the present invention;

FIG. 2 is a fragmentary inside elevational view of the rear end portions of the cap and load bed right side walls of the cap and load bed combination and with the right side of the cap in a closed position illustrated in solid lines and an open position in fanthom lines;

FIG. 3 is a vertical sectional view of the fanthom line position of the assemblage illustrated in FIG. 2 as seen from the right side thereof;

DETAILED DESCRIPTION OF THE PREFERRED EMBODIMENT

Figure 4:
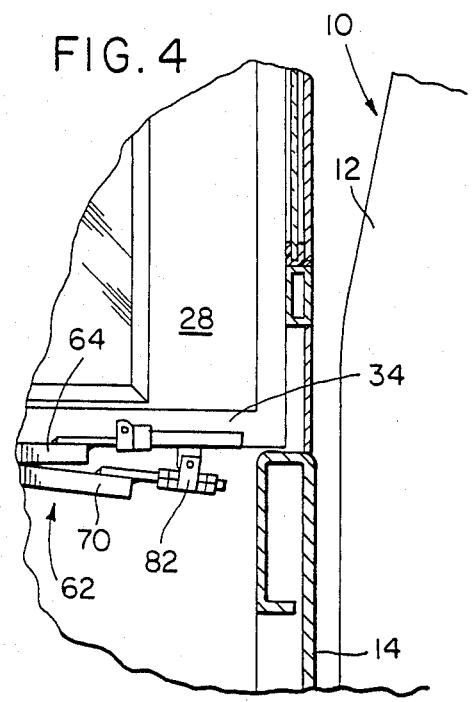
FIG. 4 is a fragmentary longitudinal vertical sectional view illustrating the forward ends of the left side walls of the load bed and cap with the cap in a closed position.
Figure 5:
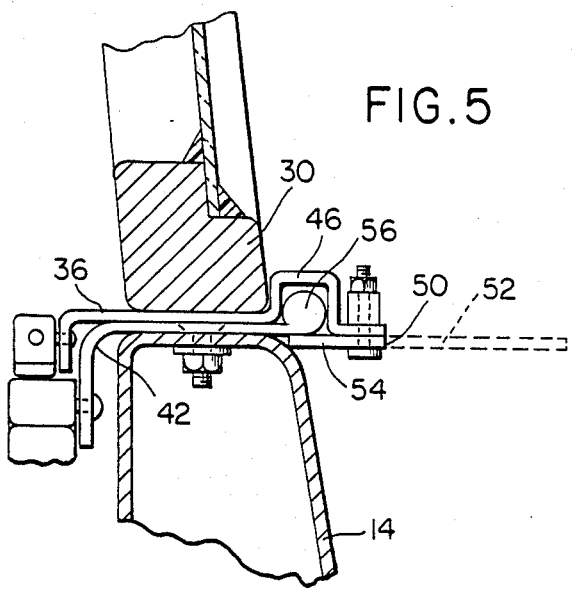
FIG. 5 is an enlarged fragmentary vertical sectional view taken substantially upon the plane indicated by the section line 5—5 of FIG. 2.
Figure 8:
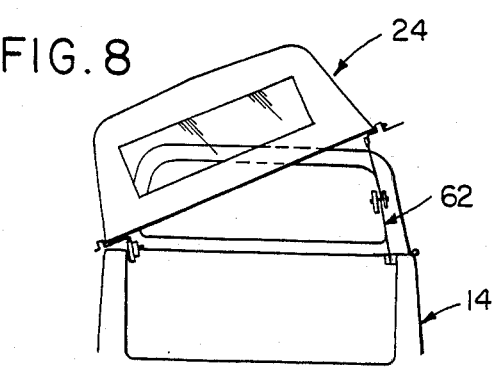
FIG. 8 is a rear schematic view of the load bed and cap combination with the right side of the cap supported in an open position.

Referring now more specifically to the drawings, the numeral 10 generally designates a pickup truck including a forward cab 12 and a rear load bed 14. The load bed 14 includes an upstanding transverse front wall 16 and opposite side walls 18 and 20 extending rearwardly from the front wall 16. In addition, a bed floor or bottom wall 22 extends between and interconnects the lower marginal portions of the wall 16, 18 and 20.

The load bed 14 includes a downwardly opening cap referred to in general by the reference numeral 24 disposed thereover. The cap 24 includes an upstanding front wall structure 26, opposite side wall structures 28 and 30 extending rearwardly of the front wall structure 26 and a top wall structure 32 extends between and interconnects the upper marginal portions of the front and side wall structures 26, 28 and 30.

Figure 6:
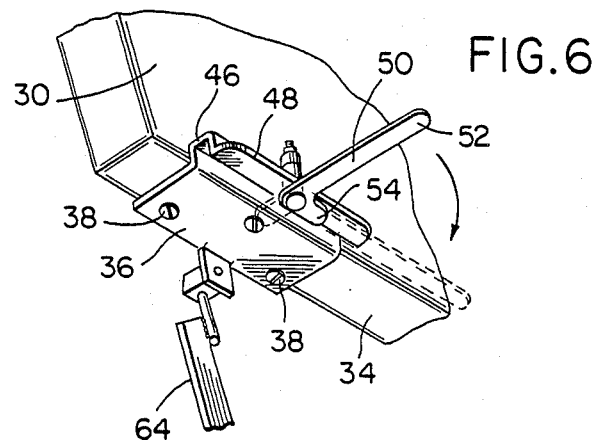
FIG. 6 is a perspective view of the right rear cap side wall lower margin supported mounting structure fragmentarily illustrating the upper portion of the associated link structure and with the associated latch in the released position.
Figure 9:
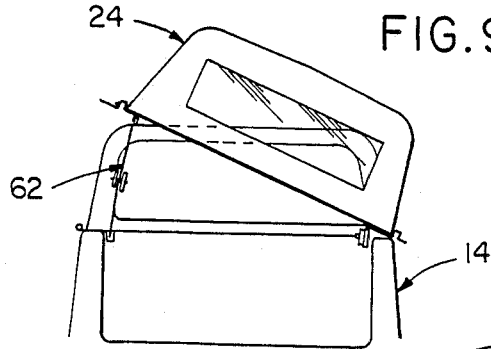
FIG. 9 is a rear schematic view similar to FIG. 8 but with the left side of the cap illustrated in an open position.
Figure 7:
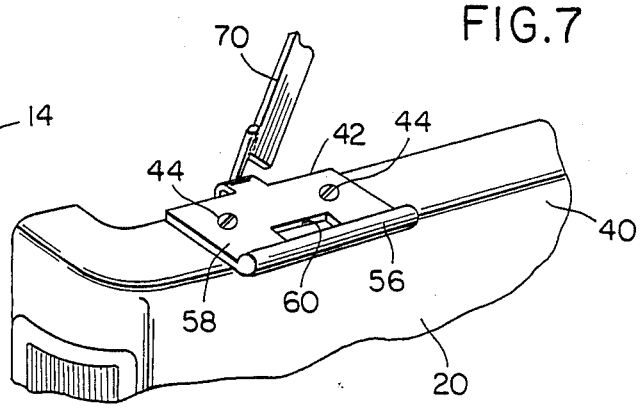
FIG. 7 is a fragmentary perspective view illustrating the rear load bed right side wall supported mounting structure with the adjacent portion of the associated link structure fragmentarily illustrated.

With attention now invited more specifically to FIGS. 6 and 7, and with reference also to FIGS. 1, 2, 4 and 5, the opposite ends of each lower marginal portion 34 of each side wall structure 28 and 30 includes an upper mounting structure 36 supported therefrom through the utilization of suitable fasteners 38 and the opposite ends of each upper marginal portion 40 of each side wall 18 and 20 includes a lower mounting structure 42 supported therefrom by suitable fasteners 44. The upper mounting structures 38 define downwardly opening channel member portions 46 extending along the corresponding side wall structure and including outwardly projecting horizontal flanges 48 from which bell crank latches 50 are pivotally supported, the latches 50 each including a long handle defining lever arm 52 and a short latch defining lever arm 54.

Each of the lower mounting structures 44 includes a partial cylindrical outer portion 56 which is rotatably receivable within the corresponding channel member portion 46 and each partial cylindrical outer portion 56 is carried by the outer marginal edge of the mounting plate portion 58 of the corresponding lower mounting structure 44, each mounting plate portion 58 including a window 60 formed therein for receiving the free end of the corresponding lever arm 54 therethrough.

The cap 24 is supported from the load bed 14 with the lower marginal portions 34 closely juxtaposed relative to and supported from the upper marginal portions 40 and with the partial cylindrical outer portions 56 seated in the corresponding channel member portions 46. In this manner, the cap 24 is supported from the load bed 16 against lateral shifting relative thereto transversely of the load bed 14. If it is desired, the partial cylindrical outer portions 56 may be slightly less in length than the channel member portions 46 and the opposite ends of the channel member portions 46 may be closed to also prevent horizontal shifting of the cap 24 relative to the load bed 14. However, such a modification is not necessary in view of the four articulated and spring biased link assemblies or support and guide means referred to in general by the reference numeral 62 and operably connected between each pair of corresponding upper and lower mounting structures 36 and 42.

Each of the link assemblies 62 includes a first arm 64 having a first end 66 pivotally anchored relative to a first end 68 of a second arm 70 and a coil spring 72 is operatively connected between each pair of arms 64 and 70 and yieldingly biases the arms toward the relatively extended positions thereof illustrated in solid lines in FIG. 3 and fanthom lines in FIG. 2. In addition, each link assembly 62 includes a rotatably adjustable disk 74 whereby the spring biasing action of the corresponding coil spring 72 may be adjustably varied.

When the cap 24 is in its fully lowered position illustrated in FIG. 1, the levers 50 are swung to positions with the lever arms 52 thereof paralleling the corresponding cap side wall structures. In these positions, the lever arms 54 of the levers 50 extend inwardly beneath the corresponding partial cylindrical outer portions 56 and underlie the openings or windows 60. Then, if a pair of levers 50 on one side of the cap 24 are swung to the released positions thereof illustrated in FIG. 6 and the corresponding side of the cap 24 is lifted upwardly, the lever arms 54 on the opposite side of the cap 24 swing upwardly into the corresponding windows or openings 60. When the open side of the cap 24 has been elevated to the extent illustrated in solid lines in FIG. 3 and in fanthom lines in FIG. 2, the coil springs 72 are operative to maintain the link assemblies 62 in the fully extended position thereof illustrated in FIGS. 2 and 3. By opening one side of the cap 24, access may be had to materials within the load bed 14 disposed along the corresponding side thereof and spaced well forward of the rear end of the load bed 14.

If the load bed 14 is to have a relatively high load placed thereon and such a high load will not pass beneath the rear wall or rear window opening at the rear of the cap 24, the latches 50 on both sides of the cap 24 may be swung to the released positions thereof illustrated in FIG. 6 and both sides of the cap 24 may be elevated to the upwardly displaced positions thereof. While the cap 24 is steadied in a fully upwardly displaced position, a relatively high load may be placed within the load bed, after which the cap 24 may again be lowered to the load bed side wall supported position thereof illustrated in FIG. 1.

The link assemblies 62, when in the collapsed positions thereof illustrated in FIGS. 1, 2, and 4, provide positive connections between the cap 24 and the load bed 14 in order to prevent longitudinal shifting of the cap 24 relative to the load bed 14. In addition, the ends of the arms 64 and 70 of each link assembly 62 remote from the corresponding spring 72 are pivotally anchored to the corresponding upper and lower mounting structures 36 and 42 through the utilization of pivoted blocks 80 and 82, see FIGS. 3 and 2, respectively, relative to which the adjacent ends of the arms 64 and 70 are threadedly adjustable. Accordingly, slight incorrect positioning of the upper and lower mounting structures 36 and 42 along the lower marginal portions of the side wall structures 28 and 30 and the upper marginal portions of the side walls 18 and 20 may be compensated for at the threaded connections between the arms 64 and 70 and the pivot blocks 80 and 82.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination with a pickup truck including a rear load bed of the type incorporating a transverse front wall and opposite side walls extending rearwardly from said transverse front wall and having a bed floor extending between and interconnecting lower margins of said front wall and side walls, upper marginal portions of said front wall and side walls being at least generally horizontally registered, a downwardly opening cap for said load bed including a front transverse wall structure and opposite side wall structures extending rearwardly from said cap front transverse wall structure with a top wall structure extending between and interconnecting upper margins of said front transverse wall structure and opposite cap side wall structures, said cap front transverse wall structure and cap opposite side wall structures including generally horizontally registered lower marginal portions overlying and disposed in juxtaposed position to said load bed upper marginal portions, each pair of juxtaposed opposite load bed side wall and cap opposite side wall structure upper and lower marginal portions including front and rear pairs of cap upper and load bed lower mounting structures mounted from said cap lower and upper marginal portions, respectively, each pair of cap upper and load bed lower mounting structures including coacting first and second vertically separable pivotal axis defining projection and recess means operatively vertically engaged with each other to prevent lateral shifting of said cap relative to said load bed transversely of the latter, readily vertically separable relative to each other and supporting each front and rear pair of cap upper mounting structures from the corresponding front and rear load bed lower mounting structures for angular displacement relative thereto about a horizontal axis extending between the last-mentioned load bed lower mounting structures for upward swinging of the other cap side wall structure lower marginal portion away from the corresponding load bed side wall upper marginal portion, each pair of corresponding cap upper and load bed lower mounting structures including coacting releasable latch means independently operative, when applied, to prevent vertical separation of the corresponding pair of cap upper and load bed lower mounting structures, articulated link structures operatively connected between each pair of corresponding cap upper and load bed lower mounting structures limiting vertical separation thereof and operative to support the corresponding cap side wall structure in the upper limit position of movement relative to the associated load bed side wall.

2. The combination of claim 1 wherein said link structures incorporate spring means operative to yieldingly upwardly bias said lower marginal portions of said cap side wall structures relative to said upper marginal portions of said load bed side walls.

3. In combination with a pickup truck including a rear load bed of the type incorporating a transverse front wall and opposite side walls extending rearwardly from said front transverse wall with a bed floor extending between and interconnecting lower margins of said load bed front wall and said load bed side walls, the upper marginal portions of said load bed side walls being at least generally horizontally registered, a downwardly opening cap for said load bed including a front transverse wall structure and opposite side wall structures extending rearwardly from said front transverse wall structure with a top wall structure extending between and interconnecting upper margins of said cap front transverse wall structure and cap opposite side wall structures, said cap opposite side wall structures including generally horizontally registered lower marginal portions overlying and disposed in juxtaposed position to said upper marginal portions of said load bed side walls, each pair of juxtaposed load bed upper and cap lower marginal portions including front and rear pairs of vertically engageable and separable cap upper and load bed lower mounting structures mounted from said cap lower and load bed upper marginal portions, respectively, each pair of cap upper and load bed lower mounting structures including first cap and second load bed vertically separable pivot axis defining means operably engaged with each other to prevent lateral shifting of said cap relative to said load bed transversely of the latter and supporting each cap side wall structure lower marginal portion from the corresponding load bed side wall upper marginal portion for angular displacement relative thereto about an axis extending longitudinally of said load bed, each pair of corresponding cap upper and load bed lower mounting structures including coacting releasable independently operable latch means operative, when applied, to prevent vertical separation of said pair of corresponding cap upper and load bed lower mounting structures, articulated link structures operatively connected between each pair of corresponding cap upper and lower load bed lower mounting structures limiting vertical separation thereof and operative to support the corresponding cap side wall structure in the upper limit position of movement relative to the associated load bed side wall.

4. The combination of claim 3 wherein said link structures incorporate spring means operative to yieldingly upwardly bias said lower marginal portions of said cap side wall structures relative to said upper marginal portions of said load bed side walls.

5. In combination, a pickup truck load bed including upstanding opposite side walls having upper marginal portions, a cap disposed over said load bed and including opposite side wall structures having lower marginal portions disposed above and closely juxtaposed position relative to said load bed upper marginal portions, each pair of corresponding cap lower and load bed upper marginal portions including longitudinally spaced cap upper and load bed lower mounting structures, respectively, supported therefrom and operatively releasably engaged with each other, support and guide means interconnected between each pair of corresponding cap upper and load bed lower mounting structures operative to guide each side cap wall structure relative to the corresponding load bed side wall for up and down movement relative thereto between and lowered position with said cap lower marginal portion closely juxtaposed position the corresponding load bed side wall upper marginal portion and a raised upper limit position spaced appreciably above said corresponding load bed side wall upper marginal portion, the cap upper and load bed lower mounting structures of each pair of corresponding cap lower and load bed upper marginal portions, when the corresponding lower marginal portion is in the lowered position thereof, mounting said corresponding cap lower marginal portion from the associated load bed upper marginal portion for angular displacement relative thereto about an axis paralleling said corresponding load bed upper marginal portion, whereby either cap side wall structure may be independently raised relative to the corresponding load bed upper marginal portion and swung about the axis relative to which the other cap lower marginal portion is angularly displaceable relative to the load bed upper marginal portion disposed therebelow, the cap upper and load bed lower mounting structures of each pair of corresponding cap lower and load bed upper marginal portions including releasable latch means operative to releasably latch said cap lower marginal portions against upward displacement relative to the corresponding load bed upper marginal portions, said upper mounting structures on each side wall structure defining longitudinally aligned and downwardly opening channel portions and the said lower mounting structures on each side wall upper marginal portion define longitudinally aligned partial cylindrical portions seatable and rotatable in said channel portions.

6. The combination of claim 5 wherein said support and guide means include means yieldingly biasing said side wall structures toward their upper limit positions.

* * * * *